(12) United States Patent
Bulka et al.

(10) Patent No.: US 6,928,466 B1
(45) Date of Patent: Aug. 9, 2005

(54) METHOD AND SYSTEM FOR IDENTIFYING MEMORY COMPONENT IDENTIFIERS ASSOCIATED WITH DATA

(75) Inventors: Dov Bulka, Raleigh, NC (US); Manoj Nair, Cary, NC (US)

(73) Assignee: EMC Corporation, Hopkinton, MA (US)

(*) Notice: Subject to any disclaimer, the term of this patent is extended or adjusted under 35 U.S.C. 154(b) by 727 days.

(21) Appl. No.: 09/672,421

(22) Filed: Sep. 28, 2000

(51) Int. Cl.[7] .................. G06F 15/167; G06F 17/30
(52) U.S. Cl. ......................... 709/213; 707/201
(58) Field of Search .................. 709/219, 213; 707/3, 201, 206; 711/111, 112

(56) References Cited

U.S. PATENT DOCUMENTS

| | | | |
|---|---|---|---|
| 5,008,820 A | | 4/1991 | Christopher, Jr. et al. |
| 5,390,318 A | | 2/1995 | Ramakrishnan et al. |
| 5,649,156 A | | 7/1997 | Vishlitzky et al. |
| 5,742,817 A | * | 4/1998 | Pinkoski ............ 707/200 |
| 5,745,778 A | | 4/1998 | Alfieri |
| 5,778,430 A | * | 7/1998 | Ish et al. ............ 711/133 |
| 6,014,667 A | * | 1/2000 | Jenkins et al. ............ 707/10 |
| 6,049,850 A | | 4/2000 | Vishlitzky et al. |
| 6,094,706 A | | 7/2000 | Factor et al. |
| 6,314,493 B1 | * | 11/2001 | Luick ............ 711/137 |
| 6,332,158 B1 | * | 12/2001 | Risley et al. ............ 709/219 |
| 6,370,549 B1 | * | 4/2002 | Saxton ............ 707/205 |
| 6,453,319 B1 | * | 9/2002 | Mattis et al. ............ 707/100 |
| 6,453,354 B1 | * | 9/2002 | Jiang et al. ............ 709/229 |
| 6,490,666 B1 | * | 12/2002 | Cabrera et al. ............ 711/161 |
| 6,658,536 B1 | * | 12/2003 | Arimilli et al. ............ 711/141 |
| 2003/0200197 A1 | * | 10/2003 | Long et al. ............ 707/1 |

OTHER PUBLICATIONS

Pei Cao et al., "Maintaining strong cache consistency in the world wide web", IEEE Transactions on Computers, vol. 47, iss. 4, pp. 445–457, Apr. 1998.*
Zhu, H. et al., "Class–based cache management for dynamic web content", IEEE INFOCOM 2001, vol. 3, pp. 1215–1224, Apr. 2001.*

* cited by examiner

Primary Examiner—Jason D Cardone
(74) Attorney, Agent, or Firm—A. Jose Cortina; Daniels Daniels & Verdonik, P.A.; R. Kevin Perkins

(57) ABSTRACT

This invention provides a negative cache management system and method for controlling valid and invalid memory component identifiers, and, thereby, accelerates performance of relatively high speed memory components, including hardware and software systems, that operate with storage devices. This invention includes (a) logic to check the cache to determine if a received memory component identifier is invalid, (b) logic to add the invalid memory component identifier to the cache, such as adding a file identifier to the cache when a search in a directory for a file name is unsuccessful, (c) logic to monitor new memory component identifiers being created and to remove an entry from the invalid list if that file identifier later becomes valid, (d) logic to monitor memory component identifiers being deleted or moved and to add an entry from the invalid list if that file identifier becomes invalid, (e) logic to manage the most frequently used invalid memory component identifiers, and (f) logic to manage the most recently used invalid memory component identifiers.

30 Claims, 6 Drawing Sheets

METHOD AND SYSTEM FOR IDENTIFYING MEMORY COMPONENT IDENTIFIERS ASSOCIATED WITH DATA

COPYRIGHT NOTIFICATION

A portion of the disclosure of this patent document and its figures contain material that is subject to copyright protection. The copyright owner has no objection to the facsimile reproduction by anyone of the patent document or the patent disclosure, as it appears in the Patent and Trademark Office patent files or records, but otherwise reserves all copyrights whatsoever.

BACKGROUND OF THE INVENTION

1. Field of the Invention

This invention relates to data processing systems. More particularly this invention provides a negative cache management system and method for controlling valid and invalid memory component identifiers, and, thereby, accelerates performance of relatively high speed memory components, including hardware and software systems, that operate with storage devices.

2. Background

Data processing systems that are coupled to a large amount of data storage may spend significant amounts of CPU and I/O BUS time reading and writing data to and from data storage devices, such as disk drives or similar longer term data storage devices. Accordingly, many data processing systems include relatively high speed, short term caching systems that can be accessed much more rapidly by a coupled computer system without the delays associated with the mechanical motion and time delay inherent in a long term storage device. Conventional data processing systems may include caches at several levels of operation, such as, cache memory, disk cache, RAM, "macro" caches, local server caches, and web browser caches.

One of the most well known caching systems is the use of a name cache to access a directory or a file stored through the use of tree structured directories. Each disk contains a root directory, one or more subdirectories, and one or more files. Each directory contains entries for additional directories and files. A named file may be at the end of a path that passes through a root directory and one or more subdirectories (i.e., /Directory/Subdirectory/Filename). A specific file may be identified by accessing the drive, path, and filename. When a user requests a specific file, the operating system file system must take the file's pathname and search through all of the components (i.e., directories and subdirectories) to identify the location of the file associated with that filename.

In conventional file systems, the file system typically maintains a name cache containing the location of files that have earlier been requested and found. This avoids having to search again for a file every time that file is accessed. Traditionally, the unified file manager (UFM) of the file system receives a pathname/filename and first looks in the name cache to see if the location of the requested file identifier is already there. If not, the file identifier is passed to the flat file manager (FFM) that starts searching for the file in the directory. Some users might have thousands, tens of thousands, or even conceivably more files in a single directory, making it potentially very time consuming to search.

If an invalid file identifier is received, the file system will search through all directories in the PATH environment variable without finding it. Since the requested file identifier was not successfully located, nothing gets placed in the name cache. If users frequently ask for the same invalid file identifiers, the file system will be forced to repeatedly do useless searching that takes up valuable and CPU cycles and disk I/O. Accordingly, what is needed is a system and method for accelerating performance of relatively high speed memory components in such a way as to ensure that the memory addresses of invalid memory component identifiers are managed by a cache system and method that may be utilized by a coupled host computer in a relatively short period of time.

SUMMARY OF THE INVENTION

This invention provides an intelligent caching system and method that immediately accelerate the response time and throughput of all existing relatively high speed memory components, such as storage systems that include disk drives and arrays, connected to either single-, dual-, or multi-host computers. To achieve this, the caching system and method maintain one or more caches in memory that manage valid and invalid memory component identifiers, such as, caches of recently searched valid and invalid file and object identifiers, including directory files, as well as other miscellaneous information, that are used to locate directories and files in storage devices.

The caching system and method are transparent to the host computer and have an easily configurable cache capacity. In an embodiment, a negative caching system and method manages only the invalid directories and files. The negative cache management system and method can be configured as a predetermined percentage of capacity, such as 1% of a caching system and method populated with valid memory component identifiers. Alternatively, a predetermined finite number of spaces can be set aside for the negative cache. A separate negative cache is added to keep invalid memory component identifiers. This negative name cache, like the name cache, searches for a memory component identifier, such as a specified filename, when a memory component identifier is first received. If the name of the memory component identifier is stored in the negative name cache, the operating system knows that no further searching is required.

As an alternative, invalid memory component identifiers could be entered into the same name cache as the valid memory component identifiers. In this single cache embodiment, valid and invalid memory component identifiers can be differentiated by adding a validity field to the cache entry or, alternatively, by placing a default entry indicating invalidity in the field that would normally contain the location of the data fields. Similar to the embodiment that utilizes a separate negative cache, this single cache could be partitioned and configured to store a predetermined percentage of valid, such as 99% of capacity, and a predetermined percentage, such as 1% of capacity, of invalid memory component identifiers. Alternatively, a predetermined finite number of spaces can be set aside for the invalid memory component identifiers.

In another embodiment, this invention includes (a) logic to check the cache to determine if a received memory component identifier is invalid, (b) logic to add the invalid memory component identifier to the cache when a search by the flat file manager is unsuccessful, (c) logic to monitor new memory component identifiers being created and to remove an entry from the invalid list if that path name later becomes valid, (d) logic to monitor memory component identifiers being deleted or moved and to add an entry from the invalid list if that path name becomes invalid, (e) logic to manage the most frequently used invalid memory component identifiers, and (f) logic to manage the most recently used invalid memory component identifiers.

This invention is useful in providing a system and method for rapidly identifying an invalid memory component identifier, such as a directory/filename, after such memory component identifier is initially searched for and determined to be invalid.

Another use of this invention is to provide a system and method for rapidly identifying an invalid memory component identifier, such as a directory/filename, after such memory component identifier is deleted from or moved to another location of the storage device.

Another use of this invention is to reduce the time required to locate an invalid memory component identifier by accessing a negative cache that manages invalid memory component identifiers, and, therefore, eliminates the necessity of searching through the directories and filenames of a storage device, such as a disk drive.

Another use is to provide a system and method for rapidly identifying invalid memory component identifiers that have been recently searched for and that are frequently searched for. This is achieved by creating and maintaining an intelligent negative cache that uses the history of searches for invalid memory component identifiers.

These uses may be accomplished singularly, or in combination, in one or more of the embodiments of the present invention.

Additional uses, objects, advantages, and novel features of the invention is set forth in the detailed description that follows and becomes more apparent to those skilled in the art upon examination of the following or upon learning by practice of the invention.

BRIEF DESCRIPTION OF THE FIGURES

Other objects, advantages, and novel features of the present invention are more clearly understood by reference to the following description taken in connection with the accompanying figures, in which.

DETAILED DESCRIPTION

Referring now in detail to an embodiment of the invention, an example of which is illustrated in the accompanying attachments, the present invention makes use of two basic concepts. One concept is creating a cache system and method that contain valid and invalid memory component identifiers. For example, in response to an initial request to locate a specified filename, an operating system searches for data stored in a directory structure of a storage device, such as a disk drive. If the specified filename is successfully located, it is added to a name cache in main memory. If the specified filename is not successfully located, it is added to a negative name cache in main memory. Thus, the present invention is different from conventional caching systems and methods in that it creates a negative cache for memory component identifiers that are not actually located on the storage device.

The second concept manages the negative cache based on the memory components coupled to the host computer. For example, in a disk caching system, a negative name cache is maintained with the unified file manager. The next time a search is requested for the specified file identifier, the parent directory and the filename stored in the negative name cache can be immediately accessed by a unified file manager to determine whether the specified filename is stored on the disk. Thus, the present invention provides a negative cache management system and method that can be used to accelerate the input/output performance of various relatively high speed memory components, such as disk drives, arrays, routers, and buffers, connected to either single-, dual-, or multi-host computers.

Figure 1:
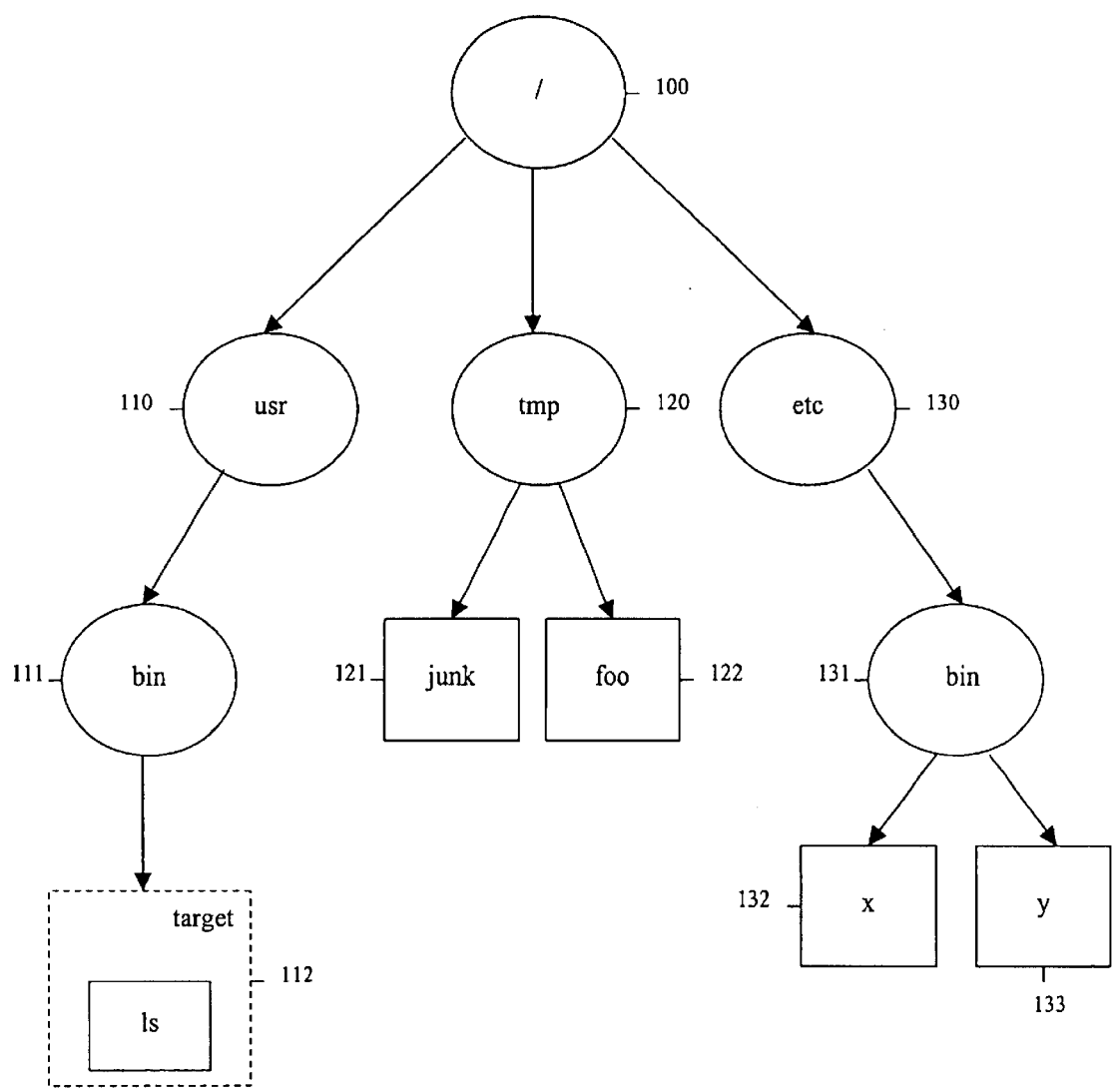
FIG. 1 is a representation of a data storage directory used in data processing systems.

Turning now to the attached figures, FIG. 1 depicts a conventional file system that is rooted at directory called "/" 100 and is referred to as the root directory. The root directory 100 has subdirectories "usr" 110, "tmp" 120, and "etc" 130 branching off of it. Each of these subdirectories directories 110–130 contains files 121–122 other subdirectores 111, and 131 which contain files 132 and 133. The UNIX "ls" command executable file 112 resides at "/usr/bin" 111 and its pathname is referred to as "/usr/bin/ls" 112. When a user types the command "ls," the system consults a special environment variable that instructs the system where "ls" could possibly be located. That variable is called a PATH environment variable, and an example of a PATH environment variable is provided below.

PATH=/tmp:/etc/bin:/usr/bin

This PATH statement tells the system that whenever an executable file is searched for, the system should look in "/tmp" 120 first. If not found in "/tmp" 120 then look in "/etc/bin" 131 next and finally, if still not found, look in "/usr/bin" 111. As it turns out in our scenario, "ls" happens to reside in the last directory, "/usr/bin" 111. This algorithm is sketched in FIG. 2.

Figure 2:
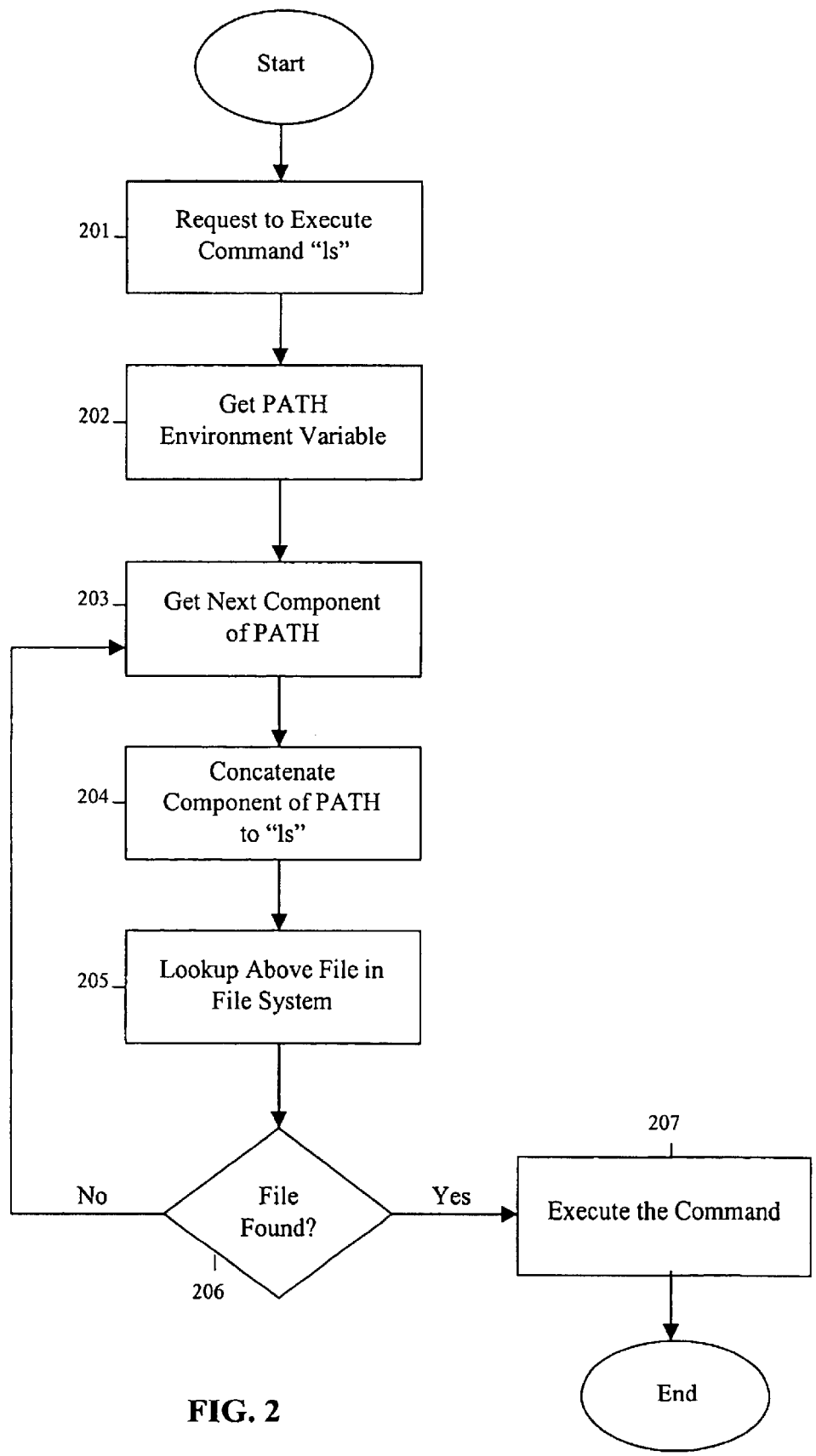
FIG. 2 is a flowchart illustrating PATH usage in data processing systems.

FIG. 2 illustrates the flowchart of PATH usage. When a request is received to execute command "ls," 201, the system consults the PATH environment variable 202 and gets the next component of the PATH 203. Thereafter, the system concatenates the component of PATH to "ls," 204 and looks up "ls" in the file system 205. The system queries if the file is found 206. If so, then the system executes the command 207. However, if the file is not found, the system gets the next component of PATH 203 until the file is found.

The problem with this system is that if "ls" is a frequently invoked command that is not found in the "/tmp" directory, then the system is going to be frequently searching for it and wasting time. The system is always going to start the search at "/tmp" and this is always going to fail. In some systems, the "/tmp" directory contains many thousands of files and searching through such a huge directory is unacceptably slow.

Figure 3:
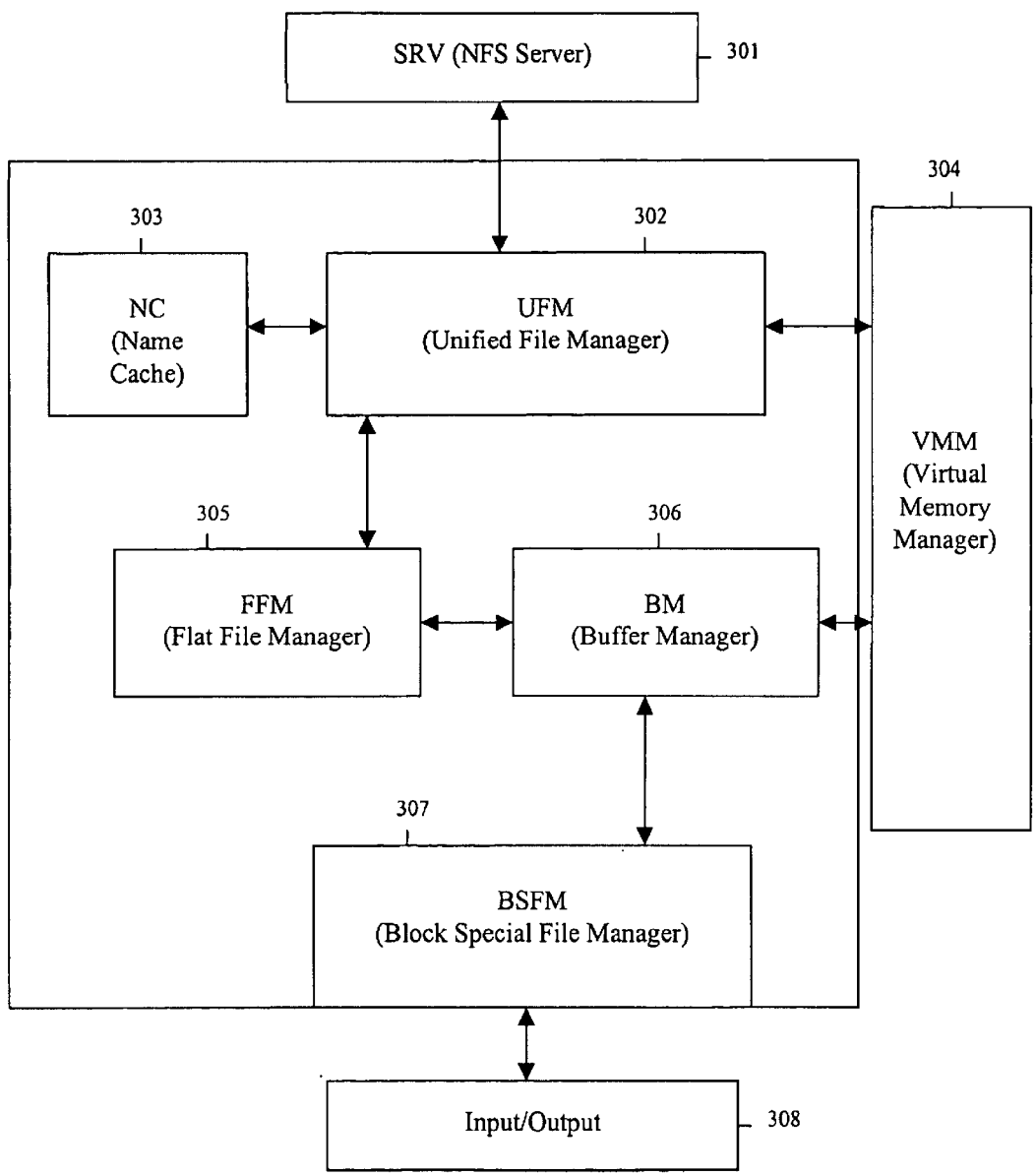
FIG. 3 is a prior art representation of the memory components of a data processing system.
Figure 4:
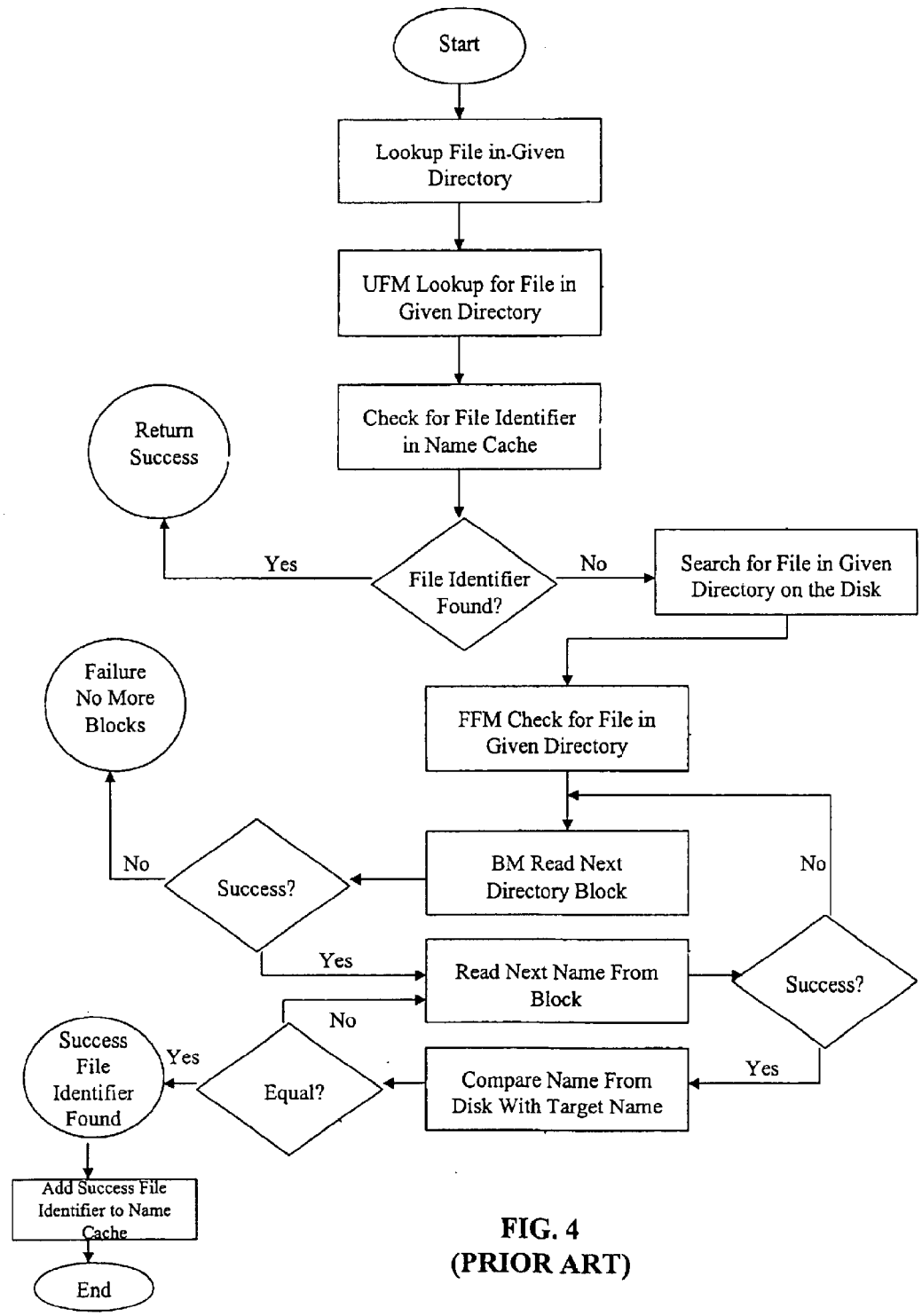
FIG. 4 is a flowchart illustrating the prior art method of searching for a filename in a data processing system.

FIGS. 3 and 4 depicts a conventional UFM subsystem that receives a directory pointer and a file name to look for in that directory from NFS Server (SRV) 301. In this illustrative example, the directory is "/tmp" and the file name is "ls." To speed such frequent searches, the UFM 302 operates with virtual memory manager (VMM) 304, and uses a Name Cache 303 that contains recent successful search results. However, an entry for "tmp/ls" is not going to exist in the name cache because no such file exists in "/tmp/ls." The Name Cache 303 remembers only successful results, not failures. In the case of frequent failures, the Name Cache 303 is of no help, and the Name Cache 303 actually decelerates the processing system because it spends CPU cycles trying to locate something that does not exist. After failing to find "/tmp/ls" in the Name Cache 303, the system moves on and ask the FFM 305 to go look for "/tmp/ls." FFM 305 asks the Buffer Manager (BM) 306, which also operates with the VMM 304, to provide a buffer containing a disk copy of the directory contents. This step may involve disk Input/Output (I/O) 308. The FFM 305 then traverses the directory contents one file at a time until the file is found or the end of the directory has been reached. This step involves accessing the Block Special File Manager (BSFM) 307 and accessing disk Input/Output 308. In the case of a huge "/tmp" directory, the system must inspect each one of its thousands of files before all entries are exhausted to declare failure. The problem with this search is that the system doesn't remember the results of that painful computation and it throws it away. The next time the "ls" command is invoked, the system repeats that expensive failure sequence of computations. FIG. 4 is a flowchart describing the above algorithm and illustrates how conventional name caches are populated.

Figure 5:
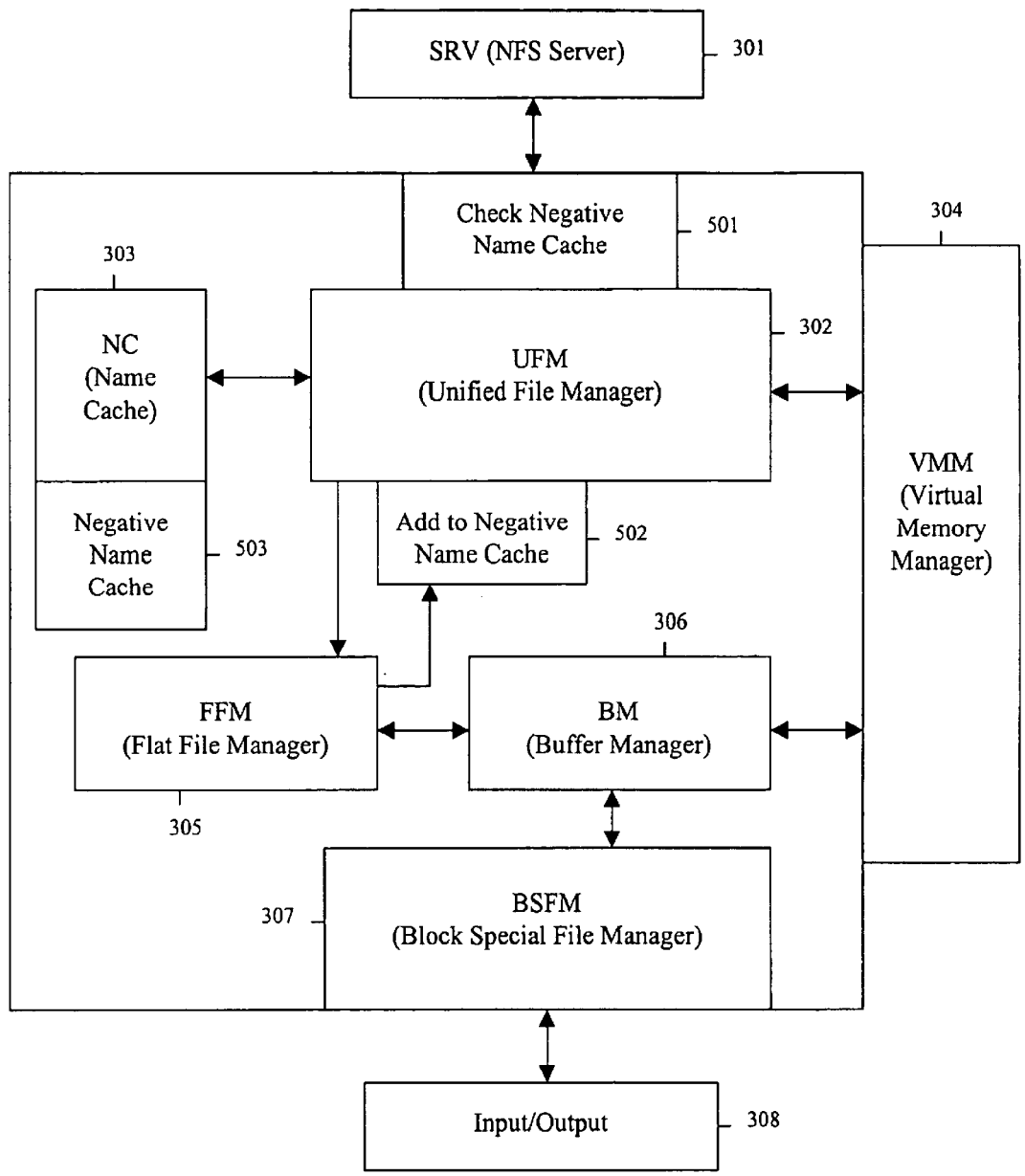
FIG. 5 is a representation of the memory components of a data processing system including use of a negative name cache in an embodiment of the present invention.
Figure 6:
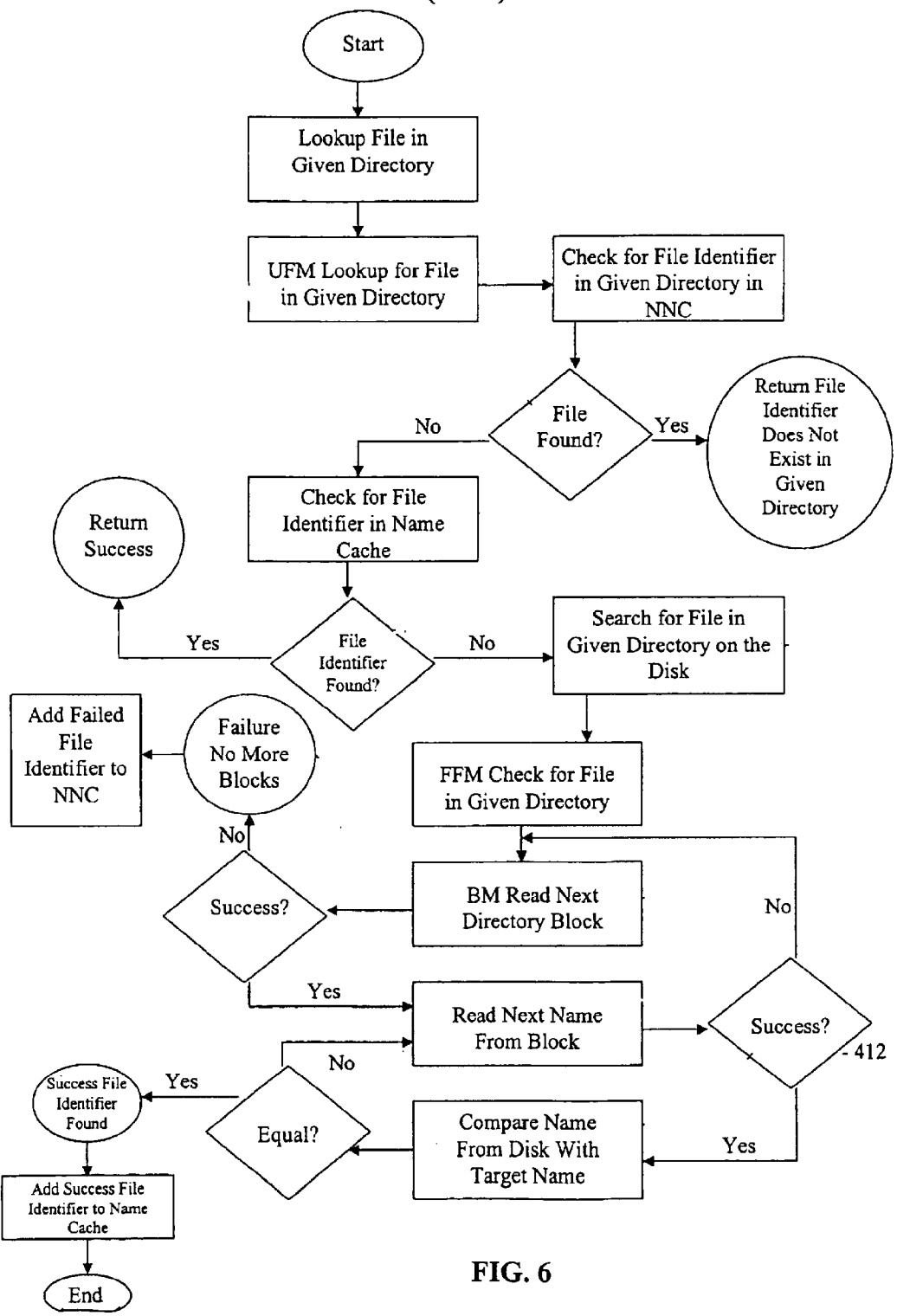
FIG. 6 is a flowchart illustrating the method of searching for a memory component identifier in a data processing system that includes use of a negative name cache in an embodiment of the present invention.

FIGS. 5 and 6 depict the UFM subsystem of the present invention including the negative name cache that receives a directory pointer and a file name to look for in that directory. In this illustrative embodiment, the directory is "/tmp" and the file name is "ls." To speed such frequent searches, the UFM 302 uses a both a Name Cache 303 that contains recent successful search results and a Negative Name Cache 503 that contains recent unsuccessful search results. In this second illustrative embodiment, the instruction includes a request to check the Negative Name Cache 501 for an entry for "/tmp/ls". This entry is going to exist in the Negative Name Cache 503 because no such file exists in "/tmp" as established by a directory/filename search for "tmp/ls." The Negative Name Cache 503 remembers the failed attempt to locate an entry for "/tmp/ls," and the system accelerates its CPU time by immediately identifying the invalid search request and avoiding the repeated computation used by conventional systems. If not found in either Name Cache 303 or Negative Name Cache 503, the system proceeds as before to the flat File Management (FFM) 305. If not found by the FFM 305, an entry is made to Add to Negative Name Cache 502 to speed up a later search looking for the file. FIG. 6 is a flowchart describing the above algorithm and illustrates how an embodiment of the negative name cache is populated.

An example of the advantages of the negative name caching system is shown in Table 1 below for an exemplary storage device with two processors and a file set that consists of 50 file systems.

|  | CONVENTIONAL CACHING SYSTEM | NEGATIVE CACHING SYSTEM |
| --- | --- | --- |
| Files | 1950050 | 1950050 |
| Files accessed for I/O operations | 195000 | 195000 |
| Directories | 65000 | 65000 |
| Filename lookups/second when 3% of files are invalid | 4000 | 5000 |

The above files are spread over the 50 file systems with a random attempt to look up filename in the system where 3% of the named files are invalid. The above results show improved CPU and I/O performance of 25%.

The present invention may be implemented in numerous embodiments. In one embodiment, a separate negative name cache is added to keep invalid file identifiers (e.g., Directory/Subdirectory/InvalidFilename). This cache, like the name cache, is searched when a file identifier is first received. If the name appears in the negative name cache, the operating system knows that no further searching is required. This prevent the need to search any further and results in a very significant performance boost.

In another embodiment, invalid file identifiers could be entered into the same name cache as the valid file identifiers. In this single cache implementation, valid and invalid file identifiers could be differentiated by inspecting the inode pointer embedded in the cache entry. The inode pointer is a file system structure that contains information about a single file. If the inode pointer is NULL, then the system identifies the file identifier as an invalid file that does not reside in the given directory. If the inode pointer is valid, then the system operates like a conventional name cache entry representing a success.

In another embodiment, this invention includes (a) logic to check the cache to determine if a received memory component identifier is invalid, (b) logic to add the invalid memory component identifier to the cache, such as adding a file identifier to the cache when a search in a directory for a file name is unsuccessful, (c) logic to monitor new memory component identifiers being created and to remove an entry from the invalid list if that file identifier later becomes valid, (d) logic to monitor memory component identifiers being deleted or moved and to add an entry from the invalid list if that file identifier becomes invalid, (e) logic to manage the most frequently used invalid memory component identifiers, and (f) logic to manage the most recently used invalid memory component identifiers. Such invalid identifiers may include: 1) identifiers that are moved from a first storage location to a second storage location; 2) identifiers that are deleted; 3) identifiers that are dynamic: 4) identifiers that are renamed; and 5: identifiers selected by a user.

In another embodiment, the negative cache size is variable, as it could have different size requirements. For example, the size of the negative cache may be based on the usage of the system or based on a predetermined percentage of capacity, such as 1% of the conventional caching system and method populated with valid memory component identifiers. Another example is to set aside a predetermined finite number of spaces for the negative cache. In addition, the negative cache may be initialized at the same time as the conventional cache during system initialization.(i.e., boot time).

In another embodiment, the negative cache can be implemented by a number of standard cache implementation techniques. For example, when the name cache is constructed it initially contains no entries, positive nor negative. Thereafter, when a file look up operation results in failure, FFM will report back to UFM about the failure. UFM, in turn, will create a new negative file identifier and place it as an entry to the negative name cache. This file identifier will represent the fact that a particular file does not reside in a particular directory. Subsequent searches for this same pair (e.g., Directory/Filename) are quickly satisfied from the negative name cache. When the negative name cache fills up, the present invention in an embodiment uses a random replacement policy in which a random entry in the cache is thrown out to make room for the new entry just created. Additionally, when a file is created, UFM needs to remove a corresponding entry from the negative name cache if such an entry exists.

The foregoing description and associated figures detail only illustrative examples of the environment in which the invention can be used and are not intended to be limiting. In addition, various programming languages, software platforms, operating systems, hardware components, memory components, and other technology may utilize the negative cache system and method to provide more efficient and reliable means for accessing data in storage devices. Furthermore, current technology can always be enhanced to incorporate the most advanced available technology to implement the negative cache system and method. Variations and modifications of the present invention is apparent to one skilled in the art, and the above disclosure is intended to cover all such modifications and equivalents.

What is claimed is:

1. A caching system for identifying memory component identifiers associated with data in a storage device, comprising:
   said storage device is a data processing system comprising a disk drive and a main memory for storing data;
   means for creating a cache of said memory component identifiers, wherein said memory component identifiers comprise identifiers that are invalid;
   said means for creating said cache further comprising, means for creating in said main memory a first name cache, means for, in response to an initial request to open a specified file nested in a path of one or more directories, accessing said disk and determining that directory entries and file entries do not contain said specified file, means for storing in said first name cache a history of paths of said directory entries and said file entries that do not contain said specified file, means for, in response to a subsequent request to open said specified file, searching through said history of said first name cache to locate said directory entries that do not contain said specified file, and means for returning a response that said specified file is not contained on said disk; and
   means for managing said cache of memory component identifiers.

2. The caching system of claim 1, wherein said cache is one of a negative cache of memory component identifiers that are not associated with data in said storage device.

3. The caching system of claim 2, wherein said negative cache comprises a predetermined number of cache entries for storing a history of said memory component identifiers that are not associated with data in said storage device.

4. The caching system of claim 3, wherein said predetermined number of cache entries is based on usage of said memory component identifier.

5. The caching system of claim 2, wherein said negative cache comprises a percentage of cache entries stored in a cache system of valid memory component identifiers.

6. The system of claim 5, wherein said negative cache is used for storing a history of said memory component identifiers that are not associated with data in said storage device.

7. The caching system of claim 2, wherein the cache is further comprises a positive cache of memory component identifiers that have been written to at least one storage device.

8. The caching system of claim 1, wherein said memory component identifiers further comprise one or more of the following:
   identifiers that are moved from a first storage location to a second storage location;
   identifiers that are deleted;
   identifiers that are dynamic;
   identifiers that are renamed; and
   identifiers selected by a user.

9. The caching system of claim 1, wherein said memory component identifiers further comprise identifiers that are valid.

10. The caching system of claim 1, wherein said data processing system further comprises:
    said disk drive including a disk in which is stored a tree structure of data located in directories and files; and
    said main memory for storing data, having said data stored in said memory in a manner accessible at a rate faster than the rate at which data stored on a disk can be accessed.

11. The caching system of claim 1, further comprising:
    means for updating said cache by removing a least recently used memory component identifier in accordance with a least recently used routine.

12. The caching system of claim 1, further comprising:
    means for updating said cache by adding a most recently used memory component identifier in accordance with a most recently used routine.

13. The caching system of claim 1, further comprising:
    means for updating said cache by adding a most frequently searched memory component identifier in accordance with a most frequently searched routine.

14. The caching system of claim 1, further comprising:
    means for updating said cache by removing a least frequently searched memory component identifier in accordance with a least frequently searched routine.

15. A caching method for identifying memory component identifiers associated with data in a storage device, comprising:
    said storage device being a data processing system comprising a disk drive and a main memory for storing data;
    creating a cache of said memory component identifiers, wherein said memory component identifiers comprise identifiers that are invalid;
    said creating a cache including creating in said main memory a first name cache, in response to an initial request to open a specified file nested in a path of one or more directories, accessing said disk and determining that directory entries and file entries do not contain said specified files, storing in said first name cache a history of paths of said directory entries and said file entries that do not contain said specified file, in response to a subsequent request to open said specified file, searching through said history of said first name cache to locate said directory entries and said file entries that do not contain said specified file, and returning a response that said specified file is not contained on said disk; and managing said cache of memory component identifiers.

16. The caching method of claim 15, wherein said cache is one of a negative cache of memory component identifiers that are not associated with data in said storage device.

17. The caching method of claim 16, wherein said negative cache comprises a predetermined number of cache entries for storing a history of said memory component identifiers that are not associated with data in said storage device.

18. The caching method of claim 17, wherein said predetermined number of cache entries is based on usage of said memory component identifier.

19. The caching method of claim 16, wherein said negative cache comprises a percentage of cache entries stored in a cache system of valid memory component identifiers.

20. The system of claim 19, wherein said negative cache is used for storing a history of said memory component identifiers that are not associated with data in said storage device.

21. The caching method of claim 16, wherein the cache is further comprises a positive cache of memory component identifiers that have been written to at least one storage device.

22. The caching method of claim 15, wherein said memory component identifiers further comprise one or more of the following:

identifiers that are moved from a first storage location to a second storage location;

identifiers that are deleted;

identifiers that are dynamic;

identifiers that are renamed; and identifiers selected by a user.

23. The caching method of claim 15, wherein said memory component identifiers further comprise identifiers that are valid.

24. The caching method of claim 15, wherein said data processing system further comprises:

said disk drive including a disk in which is stored a tree structure of data located in directories and files; and said main memory for storing data, having said data stored in said memory in a manner accessible at a rate faster than the rate at which data stored on a disk can be accessed.

25. The caching method of claim 15, further comprising:

updating said cache by removing a least recently used memory component identifier in accordance with a least recently used routine.

26. The caching method of claim 15, further comprising:

updating said cache by adding a most recently used memory component identifier in accordance with a most recently used routine.

27. The caching method of claim 15, further comprising:

updating said cache by adding a most frequently searched memory component identifier in accordance with a most frequently searched routine.

28. The caching method of claim 15, further comprising:

updating said cache by removing a least frequently searched memory component identifier in accordance with a least frequently searched routine.

29. A caching system for identifying memory component identifiers associated with data in a storage device, comprising:

a disk drive including a disk in which is stored a tree structure of data located in directories and files;

a main memory storing data, said data stored in said memory being accessible at a rate faster than the rate at which data stored on a disk can be accessed;

means for creating a cache of said memory component identifiers, wherein said memory component identifiers comprise identifiers that are invalid, and said means for creating said cache further comprises means for creating in said main memory a first name cache, means for, in response to an initial request to open a specified file nested in a path of one or more directories, accessing said disk and determining that directory entries and file entries do not contain said specified file, means for storing in said first name cache a history of paths of said directory entries and said file entries that do not contain said specified file, means for, in response to a subsequent request to open said subsequent specified file, searching through said history of said first name cache to locate said directory entries and said file entries that do not contain said specified file, and means for returning a response that said specified file is not contained on said disk; and means for managing said cache of memory component identifiers.

30. A caching method for identifying memory component identifiers associated with data in a storage device, comprising:

conducting said method in a data processing system comprising a disk drive including a disk in which is stored a tree structure of data located in directories and files, and a main memory for storing data, said data stored in said memory being accessible at a rate faster than the rate at which data stored on a disk can be accessed;

creating a cache of said memory component identifiers, wherein said memory component identifiers comprise identifiers that are invalid, including creating in said main memory a first name cache, in response to an initial request to open a specified file nested in a path of one or more directories, accessing said disk and determining that directory entries and file entries do not contain said specified files, storing in said first name cache a history of paths of said directory entries and said file entries that do not contain said specified file, in response to a subsequent request to open said specified file, searching through said history of said first name cache to locate said directory entries and said file entries that do not contain said specified file, and returning a response that said specified file is not contained on said disk; and managing said cache of memory component identifiers.

* * * * *

UNITED STATES PATENT AND TRADEMARK OFFICE
CERTIFICATE OF CORRECTION

PATENT NO. : 6,928,466 B1
DATED : August 9, 2005
INVENTOR(S) : Bulka et al.

It is certified that error appears in the above-identified patent and that said Letters Patent is hereby corrected as shown below:

Column 4,
Line 31, please insert the word -- or -- between "121-122" and "other subdirectories".

Column 5,
Line 9, please replace the phrase "/tmp/ls" with -- /tmp. --.

Signed and Sealed this

Eleventh Day of October, 2005

JON W. DUDAS
*Director of the United States Patent and Trademark Office*